(No Model.)

D. M. IRELAND.
TRAP.

No. 451,973. Patented May 12, 1891.

WITNESSES
F. Clough.
D. W. Bradford

INVENTOR
David M. Ireland
By W. W. Leggett
Attorneys.

UNITED STATES PATENT OFFICE.

DAVID M. IRELAND, OF DETROIT, MICHIGAN.

TRAP.

SPECIFICATION forming part of Letters Patent No. 451,973, dated May 12, 1891.

Application filed November 21, 1890. Serial No. 372,200. (No model.)

*To all whom it may concern:*

Be it known that I, DAVID M. IRELAND, a citizen of the United States, residing at Detroit, county of Wayne, State of Michigan, have invented a certain new and useful Improvement in Traps; and I declare the following to be a full, clear, and exact description of the same, such as will enable others skilled in the art to which it pertains to make and use the same, reference being had to the accompanying drawings, which form a part of this specification.

My invention consists in the combination, with a sheet-metal trap and its inlet and outlet pipes, of a certain new and useful coupling, by means of which the pipes are coupled to the trap.

Figure 1:
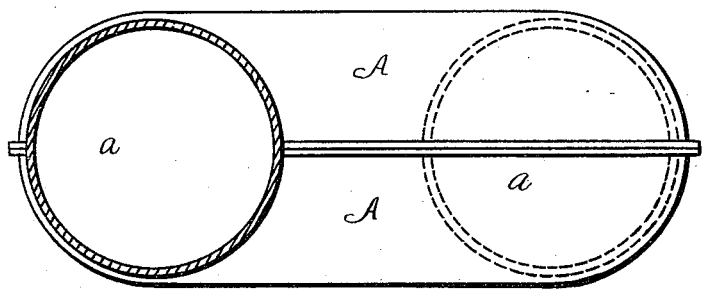
Figure 2:
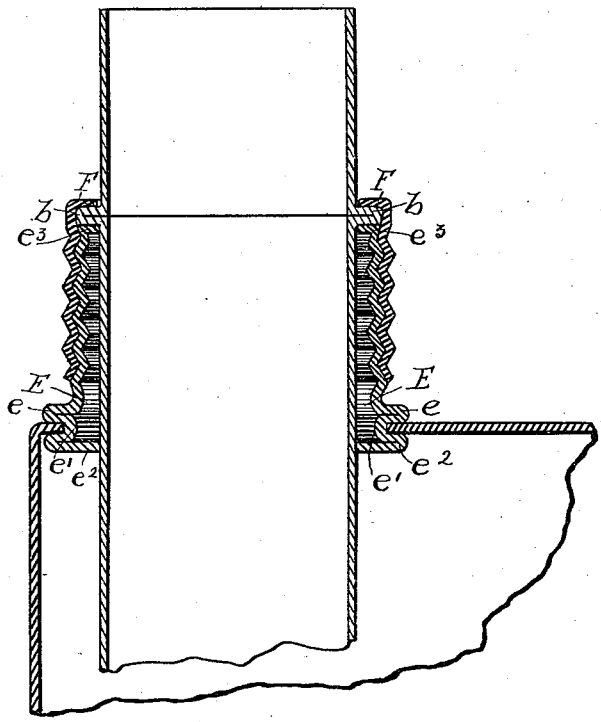

Figure 1 is a plan view of a trap with my coupling removed, in which A represents the body of the trap, and $a$ the inlet and outlet pipes. Fig. 2 is a longitudinal sectional view of my coupling in combination with a trap and pipe.

A great difficulty has been experienced with sheet-metal traps in suitably engaging to the body the proper inlet and exit conduits. The metal being thin and yielding, it has been quite difficult to engage these conduits without subjecting the structure to strain and injury. I therefore purpose to accomplish this object as follows: E is a sheet-metal nipple provided with a shoulder $e$, adapted to be brought to a bearing against the outer edge of the orifice formed for the conduit, and its inwardly-projecting end is turned outwardly and clamped beneath or upon the inside of the metal of the trap adjacent to the orifice. This sheet-metal nipple is spun or otherwise provided with screw-threads, and its upper edge is turned toward the center, forming a shoulder $e^3$. The conduit B or C, as the case may be, is provided with an annular shoulder $b$, and when properly inserted into the trap this shoulder $b$ rests on the shoulder $e^3$. A screw-cap F is now passed down over the conduit, and screwing down upon the nipple E binds the shoulder $b$ firmly onto the shoulder $e^3$. This construction presents a very great advantage, since it permits of removing the conduit-section B or C and engaging it by a proper solder joint with the admission and discharge pipes of the sink or bowl, &c., to which it is applied before the body of the trap is connected in. Then the conduits B and C are inserted into and connected with the body, as above explained.

What I claim is—

1. A trap having its body composed of sections of sheet metal joined at their edges and an inlet or outlet conduit made separable and removable therefrom, said conduit provided with an annular flange and the body provided with a threaded nipple and cap, and the conduit adapted to be secured to the body by inserting it into the nipple and binding its flange upon the nipple by the screw-cap, substantially as described.

2. A trap composed of sheet-metal made in sections engaged at their edges, an orifice for the inlet or exit conduit, a screw-threaded nipple in said orifice, with a shoulder resting upon the outside of the trap-body and turned inwardly and clamped against the inside of the body, an inlet or outlet conduit having an annular flange adapted to rest on said nipple, and a screw-cap adapted to screw upon the nipple and bind said shoulder to the exterior end of the nipple, substantially as described.

In testimony whereof I sign this specification in the presence of two witnesses.

DAVID M. IRELAND.

Witnesses:
   W. H. CHAMBERLIN,
   MARION A. REEVE.